Sept. 9, 1969  G. W. BROWN  3,465,386
LOCKING MECHANISM FOR DIFFERENTIAL PRESSURE FORMING APPARATUS
Filed June 16, 1966  3 Sheets-Sheet 1

INVENTOR.
GAYLORD W. BROWN
BY
*Learman & McCulloch*
ATTORNEYS

Sept. 9, 1969  G. W. BROWN  3,465,386
LOCKING MECHANISM FOR DIFFERENTIAL PRESSURE FORMING APPARATUS
Filed June 16, 1966  3 Sheets-Sheet 3

INVENTOR.
GAYLORD W. BROWN
BY
*Learman & McCulloch*
ATTORNEYS

United States Patent Office 3,465,386
Patented Sept. 9, 1969

3,465,386
LOCKING MECHANISM FOR DIFFERENTIAL PRESSURE FORMING APPARATUS
Gaylord W. Brown, Beaverton, Mich., assignor to Brown Machine Company of Michigan, Inc., Beaverton, Mich., a corporation of Michigan
Filed June 16, 1966, Ser. No. 558,057
Int. Cl. B29c 17/00, 3/00, 1/16
U.S. Cl. 18—19                                                5 Claims

ABSTRACT OF THE DISCLOSURE

Apparatus for differential pressure forming synthetic plastic web material wherein male and female molds between which the web material is received are moved in a path from a remote position to an engaged position, a lock is carried by one of the molds and a lock-receiving member by the other in alignment so that the lock member is freely received by the lock-receiving member when the molds are brought together, mechanism is provided for rotating one of the lock and lock-receiving members after the molds are engaged, and a ramp is provided on the lock-receiving member which overlies the lock member when the lock member and lock-receiving member are rotated relatively through part of a revolution to displace one of the lock member and lock-receiving member in an axial direction and tend to force the molds further together with a supplemental clamping force.

---

This invention relates to differential pressure forming apparatus of the kind especially adapted for use in molding articles from thermoplastic materials such as polyethylene, polyvinylchloride, polystyrene, and the like, and which may be interposed between two relatively movable mold members that are movable toward one another so as to clamp the plastic material and effect a seal between the mold members. More particularly, the invention relates to engageable and disengageable latching and clamping mechanism for such forming apparatus and which is capable not only of locking the mold sections in their molding positions, but also increasing the effective force under which the plastic material is clamped, thereby improving the seal.

An object of this invention is to provide combined latching and clamping mechanism for use in conjunction with relatively movable mold members and in which the latching and clamping mechanism not only locks the mold members against inadvertent separation, but is capable of applying on the mold members clamping forces urging them toward one another.

Another object of the invention is to provide latching and clamping mechanism of the type described and which in operation complements the clamping and sealing forces generated by the means for moving the mold members toward one another.

A further object of the invention is to provide latching and clamping mechanism which is adaptable for use in conjunction with molding apparatus previously in use.

Another object of the invention is to provide latching and clamping mechanism of the class referred to and which is adjustable to vary the maximum clamping force obtainable.

A further object of the invention is to provide relatively friction-free clamping apparatus of the kind decribed.

Another object of the invention is to provide ganged latching and clamping mechanisms on mold members and in which a plurality of ganged mechanisms may be operated from a single operating member.

Other objects and advantages of the invention will be pointed out specifically or will become apparent from the following description when it is considered in conjunction with the appended claims and the accompanying drawings, in which:

Figure 6:
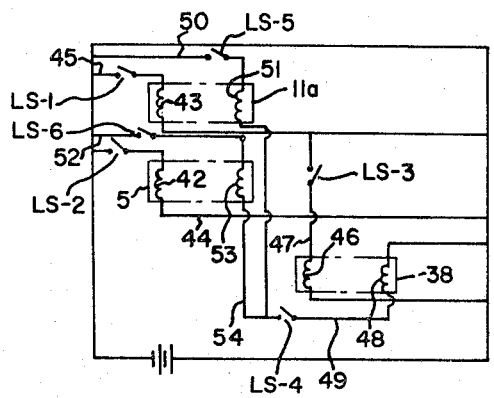

FIGURE 6 schematically shows a typical electrical control circuit which could be employed.

Figure 2:
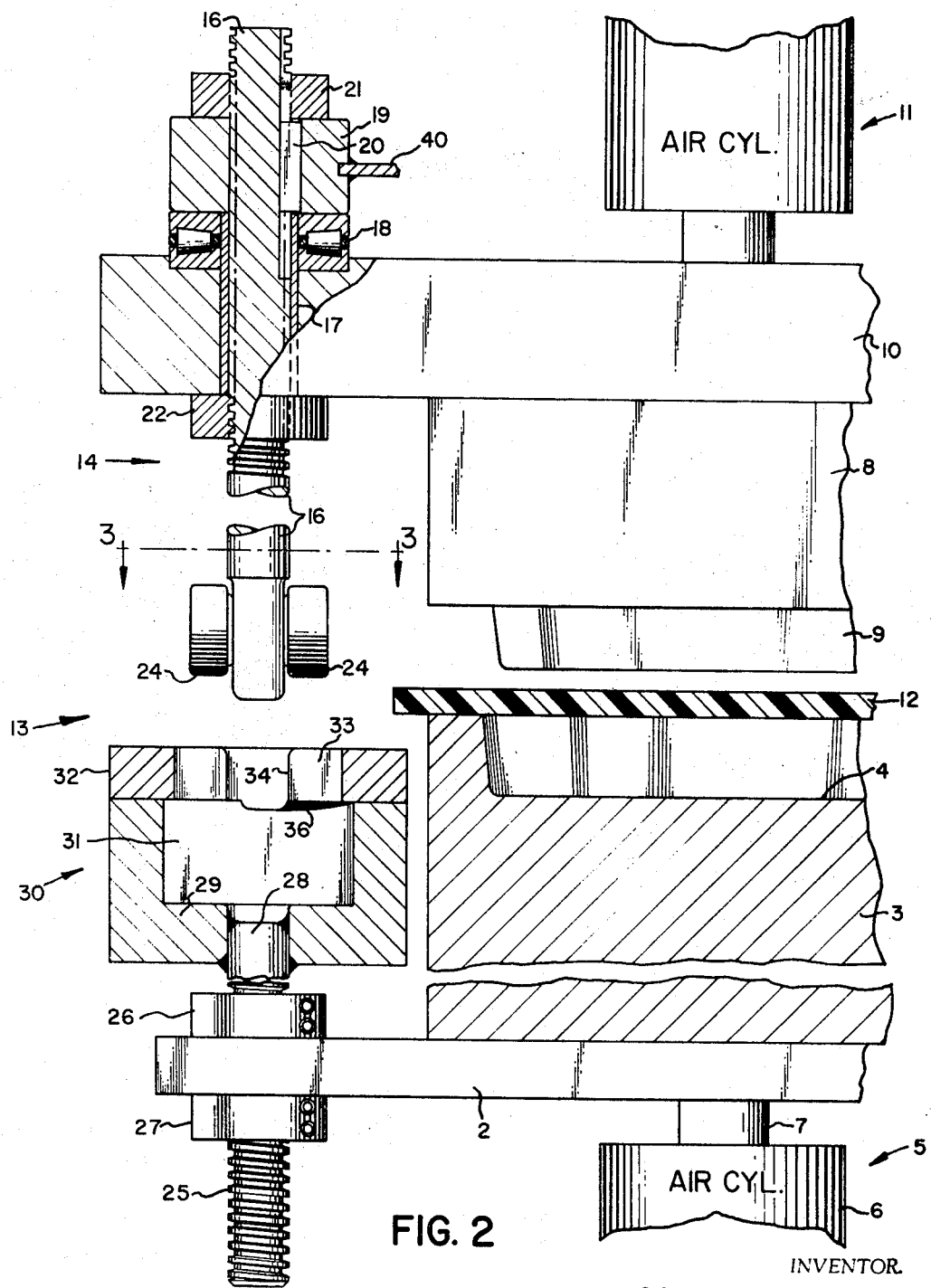
FIGURE 2 is an enlarged, fragmentary view partly in side elevation and partly in section and illustrating the mold members and latching mechanism in their disengaged positions.

Molding apparatus of the kind with which the invention is adapted for use is designated generally by the reference character 1 and comprises a lower platen member 2 to which is fixed a mold half or member 3 provided with at least one cavity 4 therein, the platen and mold members being reciprocable by means of a double-acting pneumatic or other ram 5 having a cylinder 6 in which is reciprocably mounted a piston (not shown) to which is connected a piston rod 7 that also is secured to the platen member 2. Adjacent but spaced from the mold member 3 is a companion mold member 8 having a plug assist member 9 secured thereto, the mold member 8 being fixed to an upper platen 10 which is reciprocable by means of a ram 11 similar to the ram 5 which has a cylinder 11a. A sheet 12 of deformable plastic material may be interposed between the mold members and supported either by the member 3 or by chain or the like supporting the driving means (not shown) of known kind. The arrangement is such that a plastic sheet 12 may be interposed between the mold members when they are in spaced relation, as shown in FIGURE 2. Thereafter, the rams 5 and 11 may be actuated so as to effect relative movement of the mold members toward one another, whereupon the sheet 12 will be deformed to assume the shape of the mold halves. The deformation of the plastic sheet may be assisted by positive or negative, or both, air pressures as is conventional in differential pressure forming machinery.

In the use of molding apparatus of the kind disclosed, it is important that the mold members tightly and uniformly clamp the plastic sheet therebetween. In the drawing of large parts such as refrigerator liners, for example, it sometimes happens that a complete seal around the perimeter of the mold cavity cannot be achieved by reliance solely on the platen actuating ram or by a plastic web clamping devices of the kind heretofore in use. In the event of an incomplete seal, the molded article will not be uniform and usually will have to be scrapped.

Figure 1:
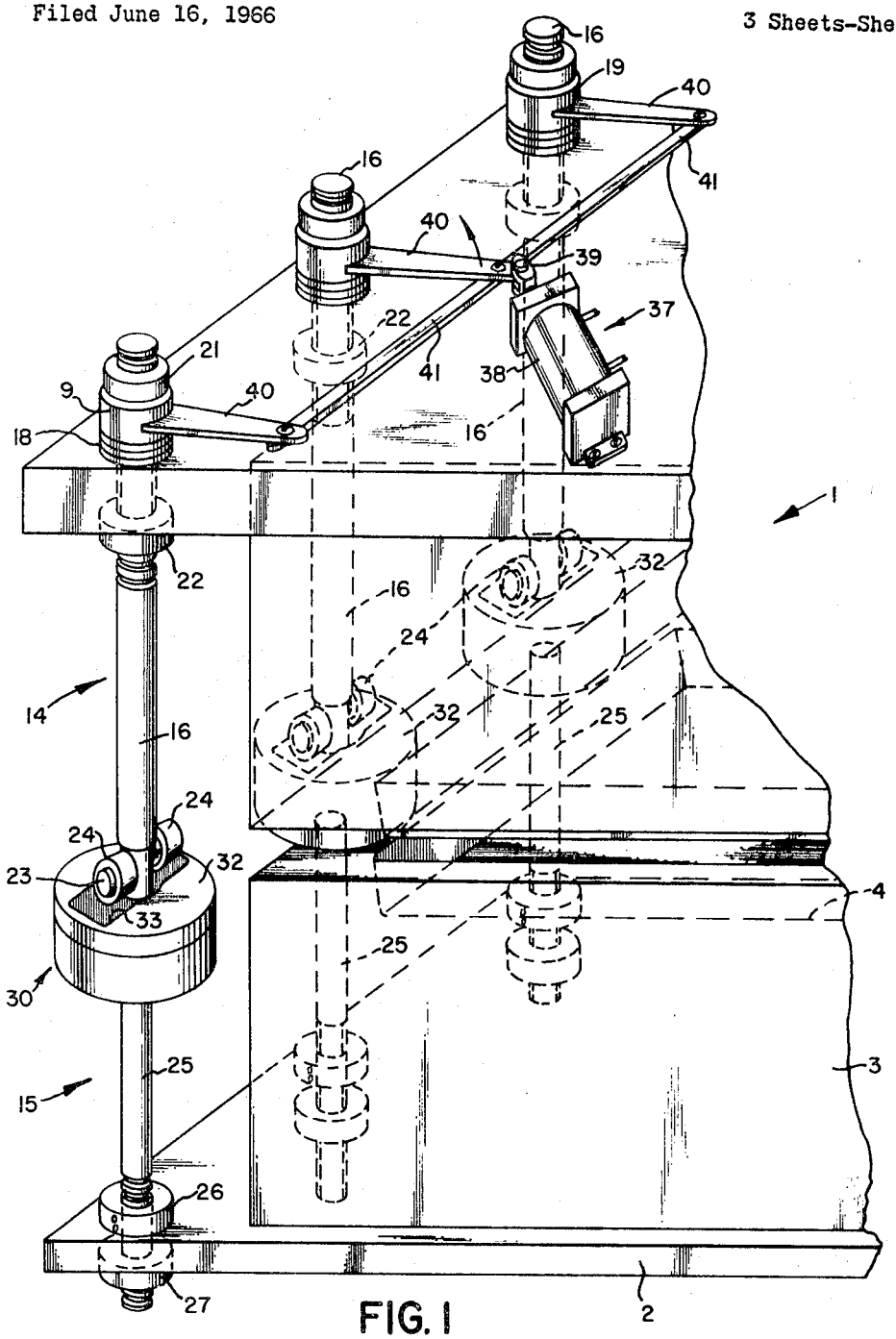
FIGURE 1 is a fragmentary, perspective view of a molding machine having latching and clamping mechanism constructed in accordance with the invention.

Engageable and disengageable force applying or clamping mechanism constructed in accordance with the invention is designated generally by the reference character 13 and comprises a gang or plurality of latch members 14 spaced about and carried by one of the mold members, and a corresponding plurality or gang of cam or keeper members 15 correspondingly spaced about and carried by the other of the mold members. A gang of three latch members and socket members is shown in FIGURE 1 at one end of the mold assembly and it will be understood that similar latch and socket members are also provided at the opposite ends of the respective mold members.

Each of the latch members 14 is identical and comprises a threaded shaft 16 rotatably journaled in a bushing 17 carried by the upper platen 10. Surrounding the bushing 17 is a thrust bearing 18 atop which is seated a driving collar 19 that is keyed by means of a key 20 to the shaft 16. An adjusting nut 21 is threaded onto the upper end of the shaft 16 and a similar nut 22 is threaded onto the shaft 16 in a position to engage the lower surface of the platen 10. At the lower end of each shaft 16 is a transverse spindle 23 on which is journaled a pair of coaxial, clamping cam followers or rollers 24. The arrangement is such that the nuts 21 and 22 may be manipulated so as to effect axial adjustment of the shaft 16 and corresponding movement of the rollers 24.

Each of the keeper members 15 also is identical and comprises a shaft 25 which extends through an opening in the lower platen 2 and is in threaded engagement with upper and lower adjusting nuts 26 and 27, respectively, which engage opposite sides of the platen 2. The upper end 28 of each shaft 25 is welded or otherwise suitably fixed to the base 29 of a cup-shaped socket member 30 defining a cavity 31. Welded or otherwise suitably secured to the member 30 is a cover 32 having an elongated slot 33 therein of such size as freely to accommodate the rollers 24. The slot 33 may have arcuate recesses 34 to accommodate the lower end of the shaft 16. The lower surface of the cover 32 is provided with a pair of diametrically opposed, segment-shaped, inclined cam surfaces or ramps 36 which lie in the path of arcuate displacement of the follower rollers 24 for engagement with the latter. The initial portions of ramps 36 are gradually tapered and the taper then increases so that a clamping pressure is exerted in a manner which will be described.

Power means 37 is provided to effect rocking or pivoting movement of at least one of the latch members 14 and comprises a hydraulic or pneumatic ram 38 the piston rod of which is pivoted as at 39 to a lever 40 that is fixed to the drive collar 19 of one of the latch members 14. Each of the other latch members is provided with a similar lever 40 and all of the levers may be interconnected by pivoted motion transmitting links 41, the arrangement being such that rocking movement of one of the levers 40 is imparted to all.

FIGURE 6 schematically illustrates a control circuit of the type which may be employed. The advance solenoids 42 and 43 of the cylinders 5 and 11a are located in a circuit line 44 and 45 and are energized by limit switches LS–1 and LS–2, limit switch LS–2 being located to be energized when vacuum mold 3 has been moved up into engagement with the heated and deformable plastic web 12. When plug assist mold 8 has moved into the cavity a limit switch LS–3 in circuit line 47 is closed so that during the terminal portion of the vertical travel of mold 8 the advance solenoid 46 of cylinder 38 is energized and just before the plug assist plate 9 ceases its movement, the rollers 24 easily traverse the initial portions of ramps 36 and thence as vertical movement ceases apply the clamping pressure to prevent separation of the molds 3 and 8. After a predetermined holding period, the retract solenoid 48 of cylinder 38 is energized when limit switch LS–4 in circuit line 49 closes. After shaft 16 has been rotated to original position limit switch LS–5 in circuit line 50 is actuated to energize the retract solenoid 51 of cylinder 11a and thereafter limit switch LS–6 in circuit line 52 is closed to energize the retract solenoid 53 in circuit line 54 and withdraw mold 3. After a suitable time delay for replacing plastic sheet 12 limit switch LS–1 is again closed.

Figure 3:
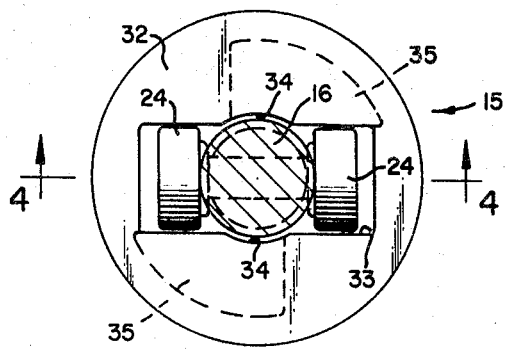
FIGURE 3 is a sectional view taken on the line 3—3 of FIGURE 2.
Figure 4:
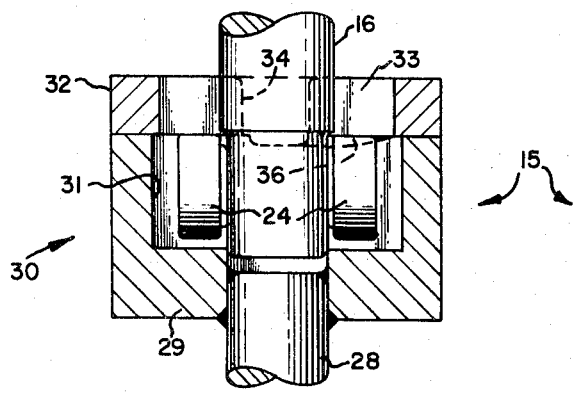
FIGURE 4 is a sectional view taken on the line 4—4 of FIGURE 3 and illustrating the latching and clamping mechanism in condition to clamp the mold members together.
Figure 5:
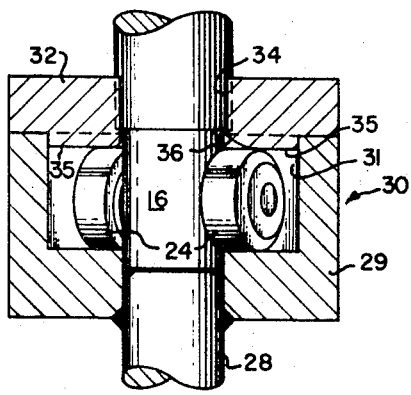
FIGURE 5 is a view similar to FIGURE 4, but illustrating the clamping mechanism in angularly adjusted, clamping condition.

In the operation of the apparatus, the latch members are axially adjusted by manipulation of the adjusting nuts 21 and 22 and the socket members 15 are axially adjusted by manipulation of the adjusting nuts 26 and 27 so that, when the platen actuating rams 5 and 11 move the respective mold members 3 and 8 into clamping engagement with the plastic sheet 12, the latch rollers 24 will be accommodated in the respective cavities of the sockets 31 to such depth as to enable the shafts 16 to be rocked counterclockwise as viewed in FIGURES 1 and 3. In these positions of the parts, the ram 38 may be actuated so as to extend its piston rod and effect rocking of the levers 40 in the direction of the arrow in FIGURE 1. Such rocking of the levers 40 will effect corresponding rocking of the associated shafts 16 and of the latch rollers 24 so as to cause the latter to engage and traverse the inclined cam surfaces 36 which lie in the path of rocking movement of the rollers. As the rollers are rocked counterclockwise, the cam surfaces 36 will exert a force on the rollers which will cause the mold members 3 and 8 to be urged forcibly toward one another, thereby clamping the sheet 12 more tightly and effecting a more positive seal.

The force exerted on the mold members 3 and 8 by the latching and socket members 14 and 15 is in addition to and complements the force exerted on the respective mold members by the actuating rams 5 and 11. The rotatable mounting of the rollers 24 provides a substantially friction free clamping engagement between the rollers 24 and the cam surfaces 36.

When the molding process has been completed, the ram 38 may be actuated so as to restore the levers 40 to their initial positions, thereby registering the rollers 24 with their respective slots 33 and disengaging the rollers from the cams. Thereafter, the rams 5 and 11 may be actuated so as to effect relative movement of the mold members away from one another.

The effective force exerted on the mold members by the latching and clamping mechanism may be varied by axial adjustment of the members 14 and 15. By moving relatively toward each other, the effective force they may exert is reduced, and vice versa. Thus, different thickness plastic sheets may be accommodated by the mold members.

Latching and clamping apparatus of the kind herein disclosed may form part of the original equipment of a molding machine, but it also may be added to such machinery already in use inasmuch as it in no way modifies or adversely affects the molding process.

The disclosed embodiment is representative of a presently preferred form of the invention, but is intended to be illustrative rather than definitive thereof. The invention is defined in the claims.

What is claimed is:

1. Apparatus for differential pressure forming moldable, synthetic plastic web material, comprising: molds, one of which has a forming cavity, and between which the web material is received, at least one of the molds being movable in a path to and from an engaged position with respect to the web material and the other mold; relatively rotatable lock and lock-receiving members carried by said molds in alignment to permit a lock member to be freely received by a lock-receiving member when the members are in one relative position of rotation and the molds are engaged; means for moving said mold in said path; means for rotating one of the lock and lock-receiving members when the members are in one relative position of rotation and the molds are engaged with the web material; and ramp means on said lock-receiving member extending generally laterally relative to said path and adapted to overlie said lock member when said lock member and lock-receiving member are rotated relatively through part of a revolution to displace one of said members in a direction tending to force said molds further together with a supplemental clamping force; said ramp means being arcuate and including a laterally inclined portion relative to said path terminating in a portion perpendicular to said path which holds said lock and lock-receiving members in a positively locked position.

2. The combination defined in claim 1 wherein said lock member and lock-receiving member are rotatable about an axis laterally outward of said cavity and generally aligned with said path.

3. The apparatus set forth in claim 1 wherein the lock member includes a follower roller mounted axially offset on a shaft journaled on one of said molds.

4. The apparatus set forth in claim 3 wherein the lock-receiving member comprises a socket having a cover plate with an opening through which the roller is freely received when the shaft and socket are in one position of relative rotation and said ramp means is provided on the underside of said cover plate adjacent said opening.

5. The apparatus set forth in claim 4 in which it is the shaft which is rotated.

References Cited

UNITED STATES PATENTS

| | | |
|---|---|---|
| 2,103,860 | 12/1937 | Mazzeo. |
| 2,319,479 | 5/1943 | Ryder. |
| 2,689,978 | 9/1954 | Roger. |
| 2,711,561 | 6/1955 | Studli. |
| 2,790,206 | 4/1957 | Cofek. |
| 2,976,569 | 3/1961 | Queré et al. |
| 2,988,778 | 6/1961 | Chaze et al. |
| 3,120,039 | 2/1964 | Stubbe et al. |
| 3,195,186 | 7/1965 | Gauban et al. |
| 3,199,159 | 8/1965 | Wernecke. |
| 3,348,267 | 10/1967 | Nouel. |

J. HOWARD FLINT, Jr., Primary Examiner

U.S. Cl. X.R.

18—16, 30, 43